Jan. 18, 1949. G. E. NICHOLS 2,459,576
PICTURE MOUNT
Filed Nov. 30, 1946 2 Sheets-Sheet 1
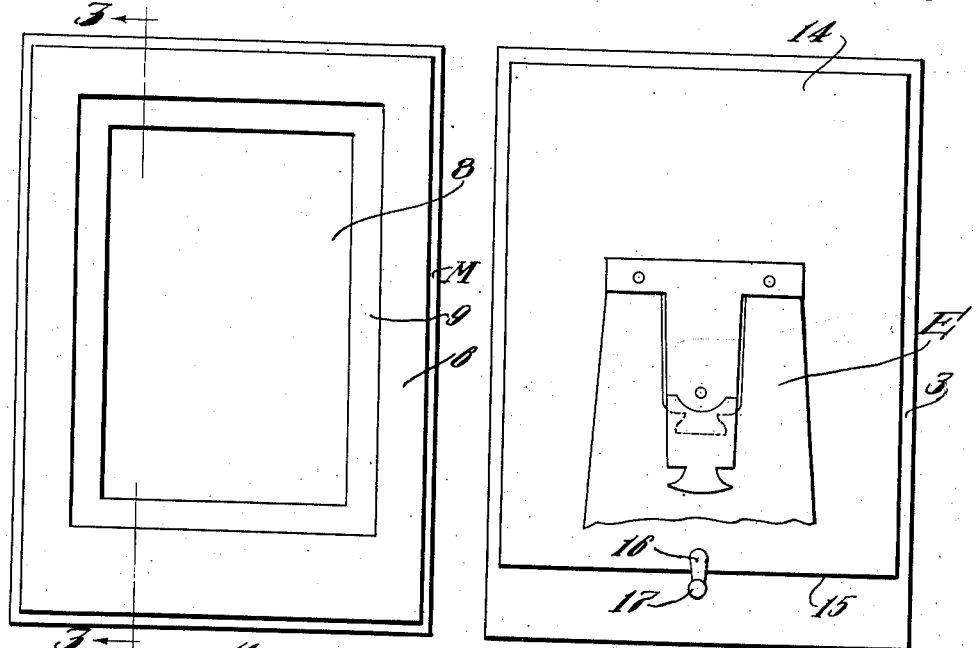
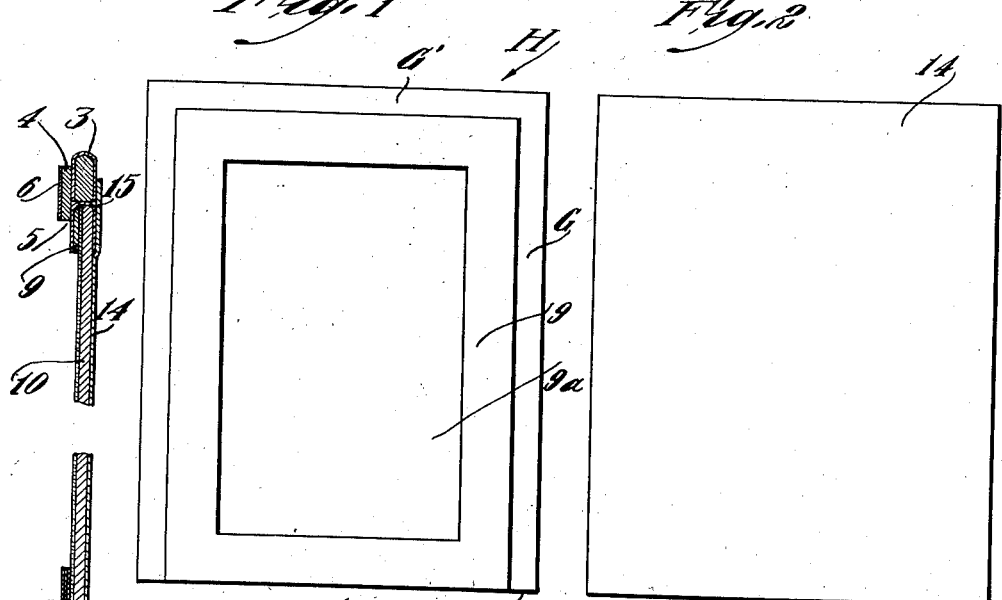
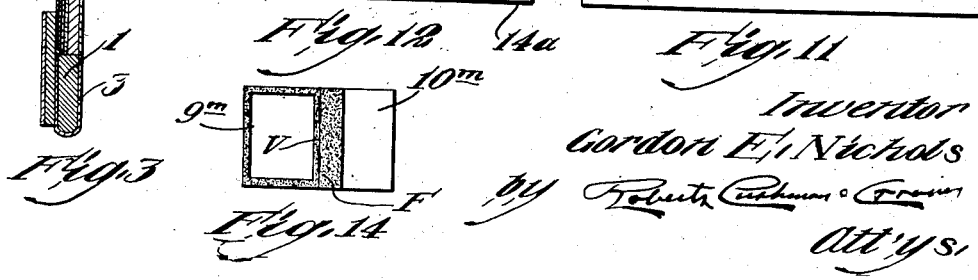
Inventor
Gordon E. Nichols
by Roberts Cushman & Grover
Att'ys.

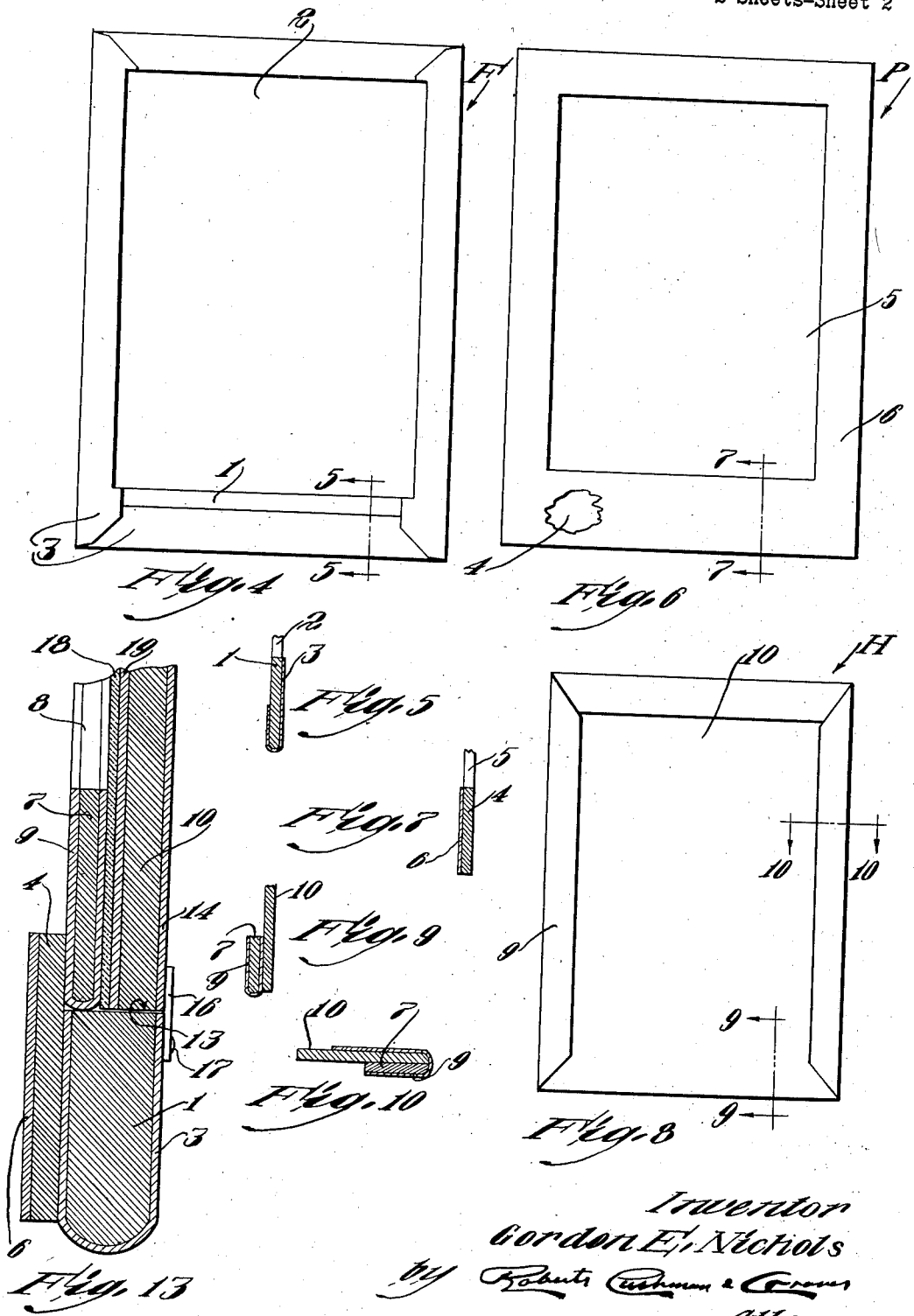

Patented Jan. 18, 1949

2,459,576

UNITED STATES PATENT OFFICE 2,459,576

PICTURE MOUNT

Gordon E. Nichols, Middleboro, Mass., assignor to Winthrop-Atkins Co., Inc., Middleboro, Mass., a corporation of Massachusetts Application November 30, 1946, Serial No. 713,197

10 Claims. (Cl. 40—152)

This invention relates to mounts for photographs, pictures or the like, and more particularly to a mount having an opening in its back to permit introduction of the picture into the well or pocket designed to receive it. One object of the present invention is to provide a mount so designed that the opening for the reception of the picture is self-closing and substantially dust-tight. A further object is to provide a mount which is very strong and stiff, although made of relatively thin material and which does not tend to curl during use. A further object is to provide a mount so devised that ornamental effects may readily be attained, in particular by the use of juxtaposed materials of contrasting color or character. A further object is to provide a mount whose parts are of simple contour and easy to prepare and assemble, and which, although cheap to construct, has the appearance and characteristics of more expensive mounts made in accordance with prior procedures. A further object is to provide a mount having a rigid back member capable of forming a good anchorage for an easel or leg structure. Other and further objects and advantages of the invention will be pointed out in the following more detailed description and by reference to the accompanying drawings wherein Fig. 1 is a front elevation of the complete mount of the present invention;

Fig. 2 is a rear elevation of the mount of Fig. 1 with certan parts broken away;

Fig. 3 is a fragmentary section substantially on the line 3—3 of Fig. 1;

Fig. 4 is a rear elevation of the frame portion of the mount before assembly with the other parts;

Fig. 5 is a fragmentary section on the line 5—5 of Fig. 4;

Fig. 6 is a front elevation of the front piece of the frame, partly broken away;

Fig. 7 is a fragmentary section on the line 7—7 of Fig. 6;

Fig. 8 is a rear elevation of the picture holder before assembly with the frame;

Fig. 9 is a fragmentary section on the line 9—9 of Fig. 8;

Fig. 10 is a fragmentary section on the line 10—10 of Fig. 8;

Fig. 11 is a plan view of a rear cover and attaching sheet for the picture holder;

Fig. 12 is a front elevation of the holder assembled with its cover sheet in readiness for assembly with the frame;

Fig. 13 is a fragmentary section, to very large scale, substantially on the same plane as Fig. 3, showing the parts of the mount assembled and with a picture and transparent panel disposed in the pocket in the holder; and Fig. 14 is a small scale, plan view of a holder blank of modified construction.

Referring to the drawings the numeral 1 (Figs. 4, 5 and 13) designates the core member of the frame F. This core member is preferably of stiff sheet material, for example cardboard, here shown as of rectangular contour, and having the rectangular opening or "well" 2. Preferably the bottom rail of this core member is wider at the sides and top. In order to provide a pleasing, and if desired, ornamental finish for this core member, its exposed portions are concealed by a cover sheet 3 (Fig. 5). This cover sheet may be of paper, cloth, thin leather or the like, and in assembling it with the core, it is caused to cover the entire rear surface of the core, then to wrap around the edges of the core, and is lapped up onto the front face of the core so as to cover at least the marginal portion of said front face. As shown in Fig. 4, this cover sheet 3 covers all of the front face of the core except the upper portion of its wide bottom rail. However, the cover need not extend inwardly to the view opening at any part of the front surface of the core, providing it does cover and conceal the marginal portions of this front face. The covering 3 is preferably adhesively secured to the core, its corners being folded at the front side of the core, as shown in Fig. 4. Instead of a covering sheet it is contemplated that the core may be covered with an enamel-like substance applied in fluid or plastic condition, or alternatively the core itself may be of a material, for instance sheeted plastic which provides a pleasingly acceptable outer surface which does not require any concealing or ornamental covering.

Associated with this frame F there is a front piece P (Fig. 6). This front piece is preferably of fairly stiff sheet material such as cardboard or celluloid and, as here shown, is of rectangular contour and of slightly less outside dimensions than the frame F. This front piece has a view opening 5 which is of lesser width and height than the well 2 in the frame. If this front piece be of ordinary cardboard or the like its front surface is provided with a finish, for example by adhesively securing to it a sheet 6 (Figs. 6 and 7) of ornamental paper or the like. Alternatively, the front face of this front piece may be finished by the application of paint or enamel, or if the front piece itself be of suitable material, its exposed front face need not have any special finish. For certain ornamental effects it is desirable that the front face of the front piece P be of a character to contrast with the exposed marginal portion of the front face of the frame F.

Having prepared the frame and the front piece P, the rear side of the latter is placed in contact with the front surface of the frame F and the parts are adhesively or otherwise permanently united. Since the outer dimensions of the piece P are less than those of the frame F, a narrow margin M (Fig. 1) of the front surface of the frame is exposed to view outside the edges of the front piece P. As the view opening 5 of the front piece P is of less width and height than the view opening 2 in the frame F, a portion of the inner margin of the front piece P extends beyond the edges of the view opening 2, the projecting margins of the front piece constituting an abutment element for positioning the picture holder now to be described.

Referring to Figs. 8, 9, 10, 11 and 12, the picture holder, as here illustrated, comprises a back member 10 of stiff sheet material, for example cardboard, whose external dimensions are such that it may fit snugly within the opening or well 2 in the frame F. The holder also comprises the matte member 7 (Figs. 9 and 10) of substantially the same external shape and dimensions as the back 10, and which has a rectangular view opening 9$^a$ (Fig. 12) of a size substantially less in width and height than the view opening 5 in the front piece P. The back member 10 and the matte 7 are united by a cover sheet 9. This cover sheet covers the entire front surface of the matte member 7 and extends around the edges of the assembled matte member and back 10 and is folded over and is secured to the rear surface of the back member 10, except at the lower edge of the back member. At this lower edge the cover sheet 9 is turned up to cover the rear surface of the matte member 7, as shown in Fig. 9, but it does not envelop the lower edge of the back member. Thus the lower portion of the back member is free from the bottom rail of the matte 7, thus permitting the lower part of the back member 10 to be sprung away from the bottom rail of the matte so as to permit a picture to be slid up in front of the back member and with its edges between the back member and the side and top rails of the matte.

As may be seen in Fig. 13, the thickness of the materials employed is such that when the frame and holder are assembled, the rear surfaces of the frame and holder are substantially flush.

Having assembled the back 10 and the matte 7 and connected them by means of the adhesively applied cover sheet 9, the holder thus formed is assembled with a cover and attaching sheet 14 (Figs. 11, 12 and 13). This cover sheet is of a width greater than that of the back member 10 so that when the holder is placed with the back member 10 against this cover sheet, as shown in Fig. 12, marginal portions G of the cover sheet extend out beyond the lateral edges of the holder. The lower edge 14$^a$ of the cover sheet 14 is arranged substantially flush with the lower edge of the back member 10, and the cover sheet 14 is of such length that it provides an upper marginal portion G' extending upwardly beyond the top edge of the back member 10. With the parts thus arranged and assembled, the cover sheet is adhesively secured to the back 10 of the holder so as to cover the entire exposed surface of the back member and also to cover the turned-in margins of the cover sheet 9.

If desired, an easel back E, of any appropriate kind, may now be secured to the picture holder, as illustrated in Fig. 2, the holder being stiff and strong and furnishing a secure anchorage for the easel. If desired a retaining button 16 (Fig. 2) may be pivotally secured at 17 to the bottom rail of the frame F, as shown in Figs. 2 and 13, so that when operatively positioned the button 16 overlaps the lower edge of the picture holder.

Assuming that the front piece P has been properly assembled with the frame F and adhesively united to the front surface of the latter, and that the holder has been prepared, as above described, the holder is now inserted from the back into the well 2 of the frame so that the finished front face of the matte 7 contacts the stop element provided by the inwardly directed margins of the front piece P. The margins G and G' of the cover sheet 14 are now adhesively united to the rear surface of the frame. Preferably this cover sheet 14 is of a material similar in character or at least in appearance to that of the material 3 which covers the frame, so that when the marginal portions G and G' are secured in position the rear side of the completed mount has a pleasing, uniform and finished appearance.

When it is desired to insert a picture, the button 16, if such is provided, is swung downwardly so as to free the lower portion of the holder, and by pushing rearwardly on the bottom rail of the matte 7, the lower portion of the holder may be sprung rearwardly so that it no longer lies in the plane of the frame and so that the picture-admitting slot between the lower rail of the matte 7 and the lower part of the back 10 of the holder is located rearwardly of the rear surface of the frame. If desired a transparent panel 18 may now be pushed up into the pocket between the back member 10 and the matte 7 and a picture 19 may be interposed between this panel and the front surface of the back member 10 of the holder. Obviously the transparent panel may be omitted if desired. When pressure is released, the holder springs back into the plane of the frame and if the button 16 is provided, this may be turned upwardly to provide additional assurance against rearward movement of the holder, such as might permit dislodgment of the picture.

In Fig. 14 there is illustrated a blank for use in making a holder of modified construction. This blank is a rectangular piece 10$^m$ of cardboard of substantially twice the size of the desired holder. This blank is cut to size in a single operation in which the view opening 9$^m$ is formed and also a score line V. Spaced portions of this score line may be cut all of the way through, if desired, the score line facilitating folding. This score line is midway between the right and left hand edges of the blank. Preferably somewhat more than one-half of one side of the blank is finished, as at F, to provide the desired surface, for instance by pasting a sheet of paper to the face of the blank. The blank is then doubled back along the line V so that its right-hand half becomes the back member of the holder. Since the two halves of this blank are integrally joined at the fold line it is not necessary to bind the edges in order to hold the front and back portions in assembled relation.

In the operative position of the parts the pocket which receives the picture and the transparent panel 18 is closed at all sides, the margins of the picture are held very firmly between the transparent panel and the rear member 10 of the holder, and there is substantially no chance for dust or moisture to enter the pocket so as to contact the picture. To remove the picture it is merely necessary to reverse the above operations, springing the rear part of the holder rearwardly and withdrawing the picture downwardly through the exposed slot at the lower part of the holder. Since the core of the frame, and the picture holder are covered at front and rear by the cover sheets 3 and 9 respectively, these parts show little tendency to curl and thus the entire mount remains flat and smooth, regardless of atmospheric moisture conditions. Moreover, since the frame and holder are independently made and thus so easily assembled and mounted, the mount may be made expeditiously and by production methods, and thus at low cost, although when completed, having the appearance of expensive mounts.

While a certain desirable embodiment of the invention has been illustrated by way of example, it is to be understood that the invention is broadly inclusive of any and all modifications falling within the scope of the appended claims.

I claim:

1. A picture mount comprising a frame member having therein a well and a picture holder disposed within the well, said holder comprising a matte, having a view opening of less area than the well, a stiff back and means uniting the back and matte at their lateral edges, the matte and back being separable at their lower edges to provide a slot for the admission of a picture between them, and attaching means uniting the holder to the frame, the attaching means being so constructed and arranged that the lower part of the holder may be sprung rearwardly out of the well to expose the slot for the admission of a picture.

2. A picture mount comprising a frame member having therein a well and a picture holder disposed within the well, said holder comprising a matte, having a view opening of less area than the well, a stiff back and means uniting the back and matte at their lateral edges, the matte and back being separable at their lower edges to provide a slot for the admission of a picture between them, and attaching means uniting the holder to the frame, the attaching means being so constructed and arranged that the lower part of the holder may be sprung rearwardly out of the well to expose the slot for the admission of a picture, and releasable retaining means normally operative to prevent the lower part of the holder from moving rearwardly.

3. A picture mount comprising a frame member having therein a well and a picture holder disposed within the well, said holder comprising a matte having a view opening of less area than the well, a stiff back and means uniting the back and matte at their lateral edges, the matte and back being separable at their lower edges to provide a slot for the admission of a picture between them, the rear surface of the back of the holder being substantially flush with the rear surface of the frame, and thin flexible sheet material uniting the back of the holder to the frame along the lateral and top edges of the holder, the lower edge of the holder being free to be sprung rearwardly out of the plane of the frame.

4. A picture mount comprising a frame member having therein a well and a picture holder disposed within the well, said holder comprising a matte having a view opening of less area than the well in the frame, a stiff back, and means uniting the back and matte at their lateral edges, the matte and back being separable at their lower edges to provide a slot for the admission of a picture between them, and a cover sheet of thin, flexible material secured to the back of the holder and having its margins extending beyond the lateral and top edges of the holder, and means securing said margins to the rear side of the frame, the lower edge of the holder being free to be sprung rearwardly to expose the picture-admitting slot.

5. A picture mount including a frame comprising a core of stiff sheet material having a rectangular well, a front piece attached to the forward surface of the core, the front piece having a rectangular view opening of less dimensions than the well in the frame whereby the front piece overlaps the margins of the well to constitute a stop element, a picture holder disposed in the well, the holder including a back member and a matte, the latter having a rectangular view opening less in area than that in the front piece, means uniting the matte and back at their top and side edges only to provide between them a picture-receiving pocket open at its bottom, the matte normally abutting the stop element, and means for retaining the holder within the well.

6. A picture mount including a frame comprising a core of stiff sheet material having a rectangular well, a front piece attached to the forward surface of the core, the front piece having a view opening of less dimensions than the well in the core whereby the front piece overlaps the margins of the well to constitute a stop element, a picture holder disposed in the well, said holder being of substantially the same front-to-rear thickness as the frame and abutting the rear surface of the stop element, and a cover sheet extending across the back of the holder and having its margins attached to the rear surface of the frame.

7. A picture mount including a frame comprising a core of stiff sheet material having a well, a front piece attached to the forward surface of the core, the front piece having a view opening of less dimensions than the well in the core whereby the front piece overlaps the margins of the well to constitute a stop element, a picture holder disposed in the well, said holder having a view opening less than that in the front piece, whereby a substantial width of the holder is exposed at the view opening in the front piece to constitute a matte for a picture within the holder, and means for retaining the holder in the well.

8. A picture mount comprising a frame which includes a core of stiff sheet material having therein a well, thin sheet material covering the entire rear surface of the core extending around the edges of the core and covering at least the marginal portion of the front surface of the core member, a front piece of stiff sheet material and means securing the front piece to the front side of the frame, the front piece having a view opening of a size smaller than the well, whereby the front piece overlaps the margins of the well to constitute a stop piece, and a picture holder disposed within the well, said holder comprising a matte member which abuts the stop element and which has a view opening of lesser dimensions than that in the front piece, whereby a portion of the matte member is exposed to view, and means operative to retain the holder in the well.

9. A picture mount comprising a frame member having therein a well and a picture holder disposed within the well, said holder comprising a matte having a view opening of less area than that of the well in the frame, a stiff back, and means uniting the back and matte at their lateral edges, the matte and back being separable at their lower edges to provide a slot for the admission of a picture between them, and a thin, flexible sheet covering the entire area of the back of the holder and having margins at its top and lateral edges which project beyond the edges of the holder and extend substantially to the corresponding edges of the frame, and means adhesively uniting said margins to the frame, the lower edge of the cover sheet being substantially in line with the lower edge of the holder, thereby leaving the latter free to be sprung rearwardly to expose the picture-admitting slot.

10. A picture mount comprising a frame which includes a core of stiff sheet material having therein a well, thin sheet material covering the entire rear surface of the core, wrapping around the edges of the core and covering at least the marginal portion of the front surface of the core member, a front piece of stiff sheet material and means securing the front piece to the front side of the frame, the front piece having a view opening of a size smaller than the well, whereby the front piece overlaps the margins of the well to constitute a stop element, and a picture holder disposed in the well with its forward surface abutting said stop element, said holder comprising a back of stiff material, and an easel member secured to said back.

GORDON E. NICHOLS.

REFERENCES CITED

The following references are of record in the file of this patent:

UNITED STATES PATENTS

| Number | Name | Date |
|---|---|---|
| 2,179,699 | McKeown | Nov. 14, 1939 |